(12) United States Patent
Gorman

(10) Patent No.: US 6,197,442 B1
(45) Date of Patent: Mar. 6, 2001

(54) METHOD OF USING A WATER TRANSPORT PLATE

(75) Inventor: Michael Edgar Gorman, Glastonbury, CT (US)

(73) Assignee: International Fuel Cells Corporation, South Windsor, CT (US)

( * ) Notice: Subject to any disclaimer, the term of this patent is extended or adjusted under 35 U.S.C. 154(b) by 0 days.

(21) Appl. No.: 09/097,955

(22) Filed: Jun. 16, 1998

(51) Int. Cl.[7] .................................................. H01M 8/00
(52) U.S. Cl. ............................... 429/13; 429/26; 429/34
(58) Field of Search ............................ 429/13, 18, 32, 429/26, 34

(56) References Cited

U.S. PATENT DOCUMENTS

| | | | | |
|---|---|---|---|---|
| 4,035,551 | * | 7/1977 | Grevstad | 429/44 |
| 4,115,627 | * | 9/1978 | Christner et al. | 429/44 |
| 4,125,676 | * | 11/1978 | Maricle et al. | 429/38 |
| 4,219,611 | * | 8/1980 | Breault | 429/13 |
| 4,269,642 | * | 5/1981 | DeCasperis et al. | 156/89 |
| 4,301,222 | * | 11/1981 | Emanuelson et al. | 429/251 |
| 4,360,485 | * | 11/1982 | Emanuelson et al. | 264/29.5 |
| 4,365,008 | * | 12/1982 | DeCasperis et al. | 429/36 |
| 4,374,906 | * | 2/1983 | Breault et al. | 429/44 |
| 4,426,340 | * | 1/1984 | Goller et al. | 264/29.1 |
| 4,670,300 | * | 6/1987 | Stewart, Jr. | 427/115 |
| 4,938,942 | * | 7/1990 | Gorman et al. | 423/448 |
| 5,300,124 | * | 4/1994 | Breault et al. | 29/623.1 |
| 5,360,679 | * | 11/1994 | Buswell et al. | 429/19 |
| 5,503,944 | * | 4/1996 | Meyer et al. | 429/13 |

FOREIGN PATENT DOCUMENTS

389020 * 10/1989 (AT).

* cited by examiner

*Primary Examiner*—Kathryn Gorgos
*Assistant Examiner*—Wesley A. Nicolas
(74) *Attorney, Agent, or Firm*—Barlow, Josephs & Holmes, Ltd.

(57) ABSTRACT

A water transport plate is provided with optimized physical characteristics to greatly improve fuel cell operation. In a preferred method of manufacturing, graphite powder, reinforcing fibers, cellulosic fibers, and a thermosetting resin are mixed with a liquid to form a slurry and showered onto a screen to form a planar sheet which is dried to form paper. The paper is cut into the desired size and is laid-up. The lay-up is laminated with pressure and heat, carbonized, and graphitized to form a water transport plate for later machining as desired. The finished water transport plate exhibits optimal physical characteristics for bubble pressure, water permeability, median pore size, porosity, thru-plane resistivity and compressive yield strength.

9 Claims, 2 Drawing Sheets

METHOD OF USING A WATER TRANSPORT PLATE

BACKGROUND OF THE INVENTION

The present invention relates to water transport plates. More specifically, the present invention relates to water transport plates and a method of use thereof.

Solid polymer electrolyte fuel cell power plants are known in the prior art, and prototypes are even available from commercial sources, such as Ballard Power Systems, Inc. of Vancouver, Canada. These systems are serviceable, but are relatively complex. An example of a Ballard Power Systems polymer membrane power plant is shown in U.S. Pat. No. 5,360,679, granted Nov. 1, 1994. One problem occurring in solid polymer fuel cells relates to the management of water, both coolant and product water, within the cells in the power plant. In a solid polymer membrane fuel cell power plant, product water is formed by an electrochemical reaction on the cathode side of the cells, specifically by the combination there of hydrogen ions, electrons and oxygen molecules. The product water must be drawn away from the cathode side of the cells, and makeup water must be provided to the anode side of the cells in amounts which will prevent dryout of the proton exchange membrane, while avoiding flooding, of the cathode side of the electrolyte membrane.

Austrian Patent No. 389,020 describes a hydrogen ion-exchange membrane fuel cell stack which utilizes a fine pore water coolant plate assemblage to provide a passive coolant and water management control. The Austrian system utilizes a water-saturated fine pore plate assemblage between the cathode side of one cell and the anode side of the adjacent cell to both cool the cells and to prevent reactant crossover between adjacent cells. The fine pore plate assemblage is also used to move product water away from the cathode side of the ion-exchange membrane and into the coolant water stream; and to move coolant water toward the anode side of the ion-exchange membrane to prevent anode dryout. The preferred directional movement of the product and coolant water is accomplished by forming the water coolant plate assemblage in two parts, one part having a pore size which will ensure that product water formed on the cathode side will be wicked into the fine pore plate and moved by capillarity toward the water coolant passage network which is inside of the coolant plate assemblage. The coolant plate assemblage also includes a second plate which has a finer pore structure than the first plate, and which is operable to wick water out of the water coolant passages and move that water toward the anode by capillarity. The fine pore and finer pore plates in each assemblage are grooved to form the coolant passage network, and are disposed in face-to-face alignment between adjacent cells. The finer pore plate is thinner than the fine pore plate so as to position the water coolant passages in closer proximity with the anodes than with the cathodes. The aforesaid solution to water management and cell cooling in ion-exchange membrane fuel cell power plants is difficult to achieve due to the quality control requirements of the fine and finer pore plates, and is also expensive because the plate components are not uniformly produced.

In the fuel cell technology, the water transport plate is a porous structure filled with water. During fuel cell operation, the water transport plate supplies water locally to maintain humidification of a proton exchange membrane (PEM), removes product water formed at the cathode, removes by-product heat via a circulating coolant water stream, conducts electricity from cell to cell, provides a gas separator between adjacent cells and provides passages for conducting the reactants through the cell. The water transport plate supplies water to the fuel cell to replenish water which has been lost by evaporation therefrom. Due to the constraints of the water transport plate formation process, these plates are costly to manufacture and possess limited strength.

For example, water transport plates can be formed in a dry-laid process where graphite powder and powdered phenolic resin are showered into a mold to form a layer. The layer is compacted to form a 0.100 inch thick layer which is heated until the phenolic resin melts and coats the graphite powder. The resin is then cured, thereby bonding the graphite powder in a composite. Although this is a common water transport plate formation process, the forming speed is slow and it is difficult to incorporate relatively long fibers which are desirable for water transport plate structural integrity. Longer fibers tend to become entangled in the dry-laid feeder, thereby forming fiber bundles in the finished composite. This fiber bundling, which corresponds to uneven fiber distribution, creates weak areas within the composite which are susceptible to structural failure. Composite structural integrity is maximized at fiber lengths greater than about 1.0 mm (about 0.040 inches) while the dry-laid process is limited to fiber lengths of about 0.51 mm (about 0.02 inches). Consequently, the tolerances in the specification for the water transport plate are small and the fabrication is difficult, resulting in many rejected parts.

In addition, the environmental and operational parameters of a water transport plate must be carefully balanced to obtain optimum performance of the overall fuel cell. For example, parameters of the water transport plate such as pore size, resistivity, particle size, resin content and yield strength, must be properly selected to obtain bubble pressure characteristics and water permeability which are acceptable for efficient operation of the fuel cell.

In view of the foregoing, an improved water transport plate is desired which has the competing characteristics of bubble pressure and water permeability optimally and properly balanced for efficient fuel cell operation.

SUMMARY OF THE INVENTION

The present invention preserves the advantages of prior art water transport plates for fuel cells. In addition, it provides new advantages not found in currently available water transport plates, and overcomes many disadvantages of such currently available water transport plates.

The invention is generally directed to a novel water transport plate and a method for using the same. The water transport plate may be manufactured in various ways but preferably comprises a mixture of graphite powder, reinforcing fibers, cellulosic fibers, and thermosetting resin, which has been formed into a planar sheet. The water transport plate may be formed from a planar sheet which has been cut into a plurality of main sheets which have been laid-up, laminated together, carbonized, and graphitized.

The water transport plate of the present invention may be laminated which comprises mixing the graphite powder, reinforcing fibers, cellulosic fibers, and thermosetting resin with a liquid to form a slurry which is formed into a planar sheet. The liquid is then removed from the planar sheet and the sheet is cut into a plurality of main sheets. The main sheets are laid-up, laminated, carbonized, and graphitized to form the water transport plate.

The water transport plate of the present invention may also be formed by mixing the graphite powder, reinforcing fibers, and cellulosic fibers, with a liquid to form a slurry which is formed into a planar sheet. The liquid is removed from the planar sheet to form a dried sheet which is impregnated with thermosetting resin. The impregnated sheet is cut into a plurality of main sheets, laminated, carbonized, and graphitized to form the water transport plate.

It should be understood that the water transport plate of the present case can be made in a variety of different ways. However, there are certain preferred characteristics and parameters of the finished water transport plate, in accordance with the present invention, to fully optimize the operation and efficiency of a fuel cell. It is preferred that the water transport plate of the present invention have a thru-plane electrical resistivity (@ 100 psi axial load) of 0.02 ohm-cm; a compressive yield strength of 1,050 psi; a median pore size of 1.9 microns; and a open porosity of 40 volume percent (%).

It is therefore an object of the present invention to provide a water transport plate which fully optimizes the operation of a fuel cell into which it is installed.

It is also an object of the present invention to provide a water transport plate which has a construction with an optimal balance of bubble pressure and water permeability.

It is further an object of the present invention to provide a water transport plate which has optimal pore size, open porosity, resistivity and yield strength.

BRIEF DESCRIPTION OF THE DRAWINGS

The novel features which are characteristic of the present invention are set forth in the appended claims. However, the inventions preferred embodiments, together with further objects and attendant advantages, will be best understood by reference to the following detailed description taken in connection with the accompanying drawings in which:

DETAILED DESCRIPTION OF THE PREFERRED EMBODIMENT

The present invention is directed toward a water transport plate comprising graphite powder, cellulosic fibers, and reinforcing fibers all bonded together with a thermosetting resin. This water transport plate may be formed in a paper-making process where the cellulosic fibers provide sufficient wet-strength in the fabrication process such that the paper, in the form of a wet, flat sheet, possesses sufficient tensile strength to traverse the entire papermaking machine without breaking. In contrast, the reinforcing fibers provide structural integrity to the finished water transport plate. The graphite powder provides increased thermal and electrical conductivity in the finished water transport plate as well as principally influencing the median pore diameter thereof, while the thermosetting resin binds the fibers and graphite powder together by forming a continuous phase throughout the water transport plate after lamination and provides an electrical and thermal bridge between the individual graphite particles for enhanced electrical and thermal conductivity after graphitization.

Figure 3:
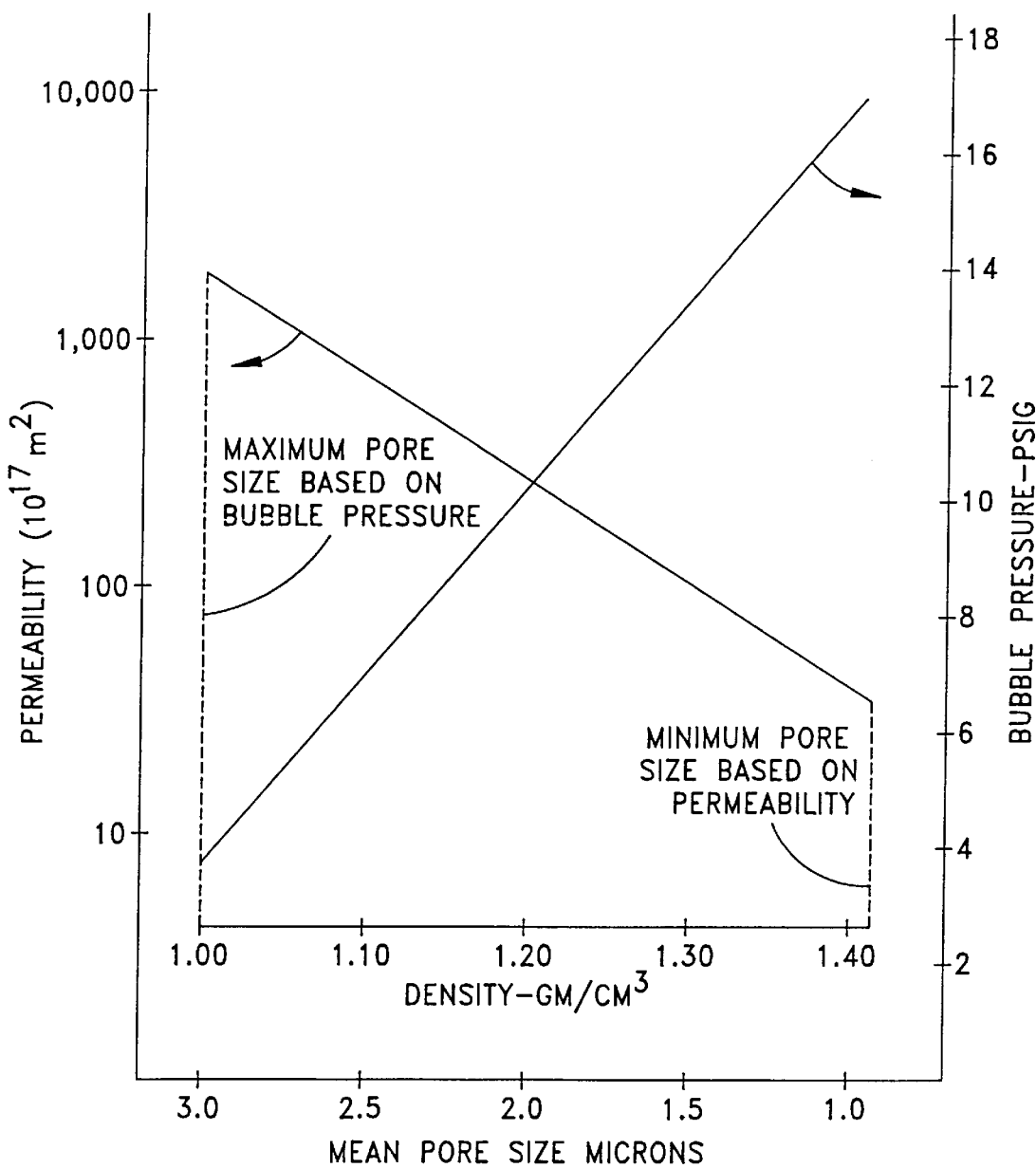
FIG. 3 is a graph illustrating the trade-off between bubble pressure and water permeability in connection with the selection of pore size.

The water transport plate of the present invention can be manufactured in different ways. However, the pore size and porosity of the water transport plate must be carefully tailored to achieve an optimum trade-off between bubble pressure and water permeability. Bubble pressure is the physical characteristic that allows the water transport plate to serve as a gas separator. Capillary forces retain the water within the porous structure until the gas to liquid pressure differential exceeds the bubble pressure. Bubble pressure is increased as the pore size of the water transport plate is decreased. Water permeability is required to remove liquid water from the cathode to the water transport plate as explained in U.S. Pat. No. 5,503,944. FIG. 3 generally illustrates how permeability increases as the mean pore size of the water transport plate increases. In accordance with the present invention, the median pore size is preferred to be 1 to 3 microns and a minimum porosity of 30 percent provides an acceptable combination of bubble pressure and water permeability. Consequently, the median particle size of the graphite powder is typically about 1 micron ($\mu$) to about $150\mu$, with a median particle size of about 2 to about $75\mu$ preferred to attain a median pore size of up to 3.0 microns. It is preferred that the water transport plate of the present invention have a maximum thru-plane electrical resistivity (@ 100 psi axial load) of 0.02 ohm-cm; a minimum compressive yield strength of 1,050 psi; a maximum median pore size of 1.9 microns; and a minimum open porosity of 40 volume percent (%). In addition the preferred range of bubble pressure of the water transport plate is 10.5 psig and the preferred range of water permeability of the water transport plate is $200 \times 10^{-17}$ m$^2$.

The concentration of graphite powder in the final water transport plate is typically about 25 weight percent (wt %) to about 55 wt %, with about 35 wt % to about 45 wt % graphite powder preferred. Possible graphite powders include: AIRCO® 90 Graphite Powder produced by Carbide/Graphite Group, Inc., of St. Marys, Pa.; Asbury 4234 Graphite Powder produced by Asbury Graphite Mills, Inc., Asbury, N.J.; and Dixon 200-42 Graphite Powder produced by Dixon Ticonderoga, Lakehurst, N.J.; mixtures thereof; and other conventional graphite powders.

In a preferred manufacturing process for the present invention, the graphite powder is combined with reinforcing fibers which impart structural integrity to the final water transport plate. The ultimate strength of the water transport plate is governed by the amount of bonded reinforcing carbon fiber surface area. If the reinforcing fiber diameter is significantly increased to over about $15\mu$, less surface area per unit weight of fiber is available for bonding during the thermoset process (discussed below). However, if the reinforcing fiber diameter is significantly below about $5\mu$ excessive amounts of thermosetting resin are required to bond the water transport plate together. Consequently, these fibers typically have a diameter less than about $15\mu$, with a fiber diameter of about $5\mu$ to about $10\mu$ preferred.

The reinforcing fiber also preferably has a tensile modulus above about 20 MMpsi. When the tensile modulus of the reinforcing fibers falls below about 20 MMpsi, the flexural strength of the composite is no longer governed by the bonded surface area of the reinforcing fiber but by its tensile strength and the structural integrity of the water transport plate is reduced to a flexural strength below about 1000 psi. Consequently, fibers possessing a tensile modulus in excess of abut 20 MMpsi can be employed, with fibers possessing a tensile modulus equal to or in excess of about 30 MMpsi preferred.

In addition to fiber diameter and tensile modulus, the fiber length effects the ability of the reinforcing fibers to impart structural integrity to the water transport plate. Fiber lengths in excess of about 0.04 inches are preferred, with a length of about 0.10 inches to about 0.25 inches especially preferred. For a horizontal wire papermaking machine, for example, fiber lengths exceeding about 0.25 inches are typically undesirable because they diminish the uniformity of the planar sheets due to fiber bundling. Note, longer fibers may not diminish the uniformity of planar sheets formed on other papermaking machines which are more capable of handling long fibers (i.e. inclined wire papermaking machines).

Possible reinforcing fibers include, but are not limited to, carbon fibers such as polyacrylonitrile-based carbon fibers; FORTAFIL® produced by Fortafil Fiber, Inc., of Rockwood, Tenn.; Thornel produced by Amoco Performance Products, Inc., of Ridgefield, Conn.; RK produced by RK Carbon Fibres Limited of Cheshire, England; AS-4 produced by Hercules Advanced Materials and Systems Co., of Magna, Utah; PANEX® produced by Zoltek Corporation of St. Louis, Mo.; mixtures thereof, and other conventional reinforcing fibers which are compatible with the fuel cell environment.

The concentration of reinforcing fibers in the final water transport plate is typically up to about 20 wt %, with up to about 10 wt % preferred, and about 2.5 wt % to about 7.5 wt % especially preferred. Even though the flexural strength of the resultant water transport plate is significantly increased by the addition of the reinforcing fibers, it is feasible to exclude the reinforcing fibers for the purpose of minimizing material costs. Water transport plates made without reinforcing fibers may limit the cell size (i.e. planform) because scrap rates increase substantially as the planform is increased on parts with low flexural strength.

Since the water transport plate may be produced by forming planar sheets which are laminated together, cellulosic fibers are also mixed with the graphite powder and reinforcing fibers to provide sufficient wet-strength during the papermaking process such that the planar sheets are strong enough to traverse the entire papermaking machine without breaking. Typically, about 10 wt % to about 30 wt % cellulosic fibers are present in the final water transport plate, with about 15 wt % to about 27 wt % preferred. These fibers are preferably small enough to form a substantially uniform sheet while large enough to provide sufficient hydrogen bonding to impart wet strength during papermaking. Consequently, these fibers have fiber diameters of about $30\mu$ to about $45\mu$ and lengths of about 2 mm to about 4 mm. Cellulosic fibers include fibers derived from natural sources such as hardwoods, softwoods, cotton, and hemp or synthetic materials such as rayon, mixtures thereof, and others, with soft wood pulp preferred. Some such fibers include, but are not limited to Prince George, Northern, Semi-bleached Softwood Pulp, available from Canfor of Vancouver, British Columbia; Brunswick, Southern softwood pulp available from Georgia Pacific of Brunswick, Ga.; Columbus, Southern softwood pulp, available from Weyerhaeuser, of Columbus, Miss., mixtures thereof, and other conventional cellulosic fibers.

The mixture of graphite powder, reinforcing fibers, and cellulosic fibers is bonded together with a thermosetting resin which, upon carbonization and graphitization, imparts sufficient structural integrity to the composite to hold the composite together during processing. Typically, thermosetting resins which yield about 40% carbon or greater upon carbonization will impart sufficient structural integrity to the composite post graphitization and provide electrical and thermal continuity between the graphite particles in the water transport plate. Resins with carbon yields below about 40% will likely produce graphitized water transport plates having marginal strength; below about 1000 psi flexural strength. There is no known detrimental effect for incorporating higher carbon yield resins. The thermosetting resins include: phenolic resins, polyamides, petroleum pitches, and furfuryl alcohols, with phenolic resins preferred. For example, PLENCO™ phenolic resin produced by Plastics Engineering Company, Sheboygan, Wis., and OXYCHEM® phenolic resin produced by Oxychem, Durez Division, North Tonawanda, N.Y., mixtures thereof, and others. The concentration of thermosetting resin in the final water transport plate typically ranges from about 25 wt % to about 50 wt %, with about 30 wt % to about 40 wt % preferred. This thermosetting resin can be utilized either in the form of a powder preferably having particle sizes below about $20\mu$, or dispersed in a solvent such as water or an organic solvent such as methanol or ethanol.

Production of the water transport plate comprises forming the solid constituents, the graphite powder, reinforcing fibers, cellulosic fibers, and thermosetting resin, into a slurry using a liquid compatible with the solids. Generally, the liquid is water or a water based liquid. Sufficient liquid to substantially evenly distribute the solid constituents onto the screen of the papermaking machine upon which they are showered, is preferred. Typically, sufficient liquid corresponds to about 90 v/o (volume percent) liquid or greater with about 99 v/o liquid preferred.

The slurry is formed into a planar sheet at approximately 100 lineal feet per minute using a conventional papermaking machine. The slurry is showered substantially evenly onto the horizontal moving screen such that the solid constituents are retained on the screen while the liquid is allowed to pass through. The moving screen travels over a sufficient amount of vacuum sources, or other conventional means, which serve to further dry the retained solid constituents and to promote hydrogen bonding between the cellulosic fibers in the planar sheet. Once the planar sheet is sufficiently dry to support itself, it leaves the screen and travels over several rollers where it is additionally supported by felts running over the rollers. From the rollers the planar sheet travels over a series of heated drums, typically steam or oil heated drums, where residual moisture is volatilized. The dried planar sheet is then spooled onto cardboard tubes for collection. The resultant planar sheet is about 0.508 mm (millimeters; 0.02 inches) to about 1.5 mm (0.06 inches) thick and can be made at any width the particular papermaking machine is capable of forming.

Figure 1:
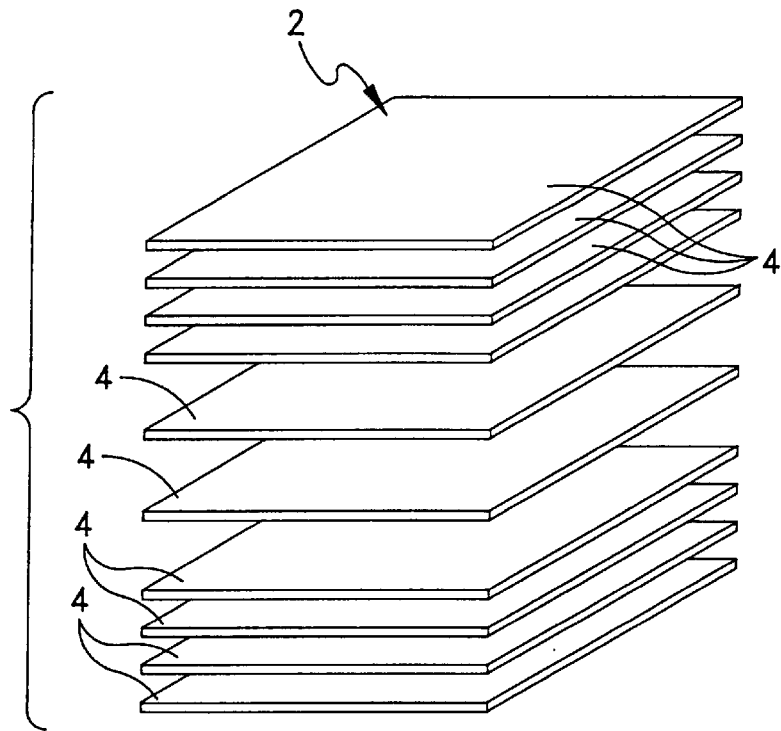
FIG. 1 is an exploded perspective view of the lay-up for a method of manufacturing the water transport plate of the present invention.
Figure 2:
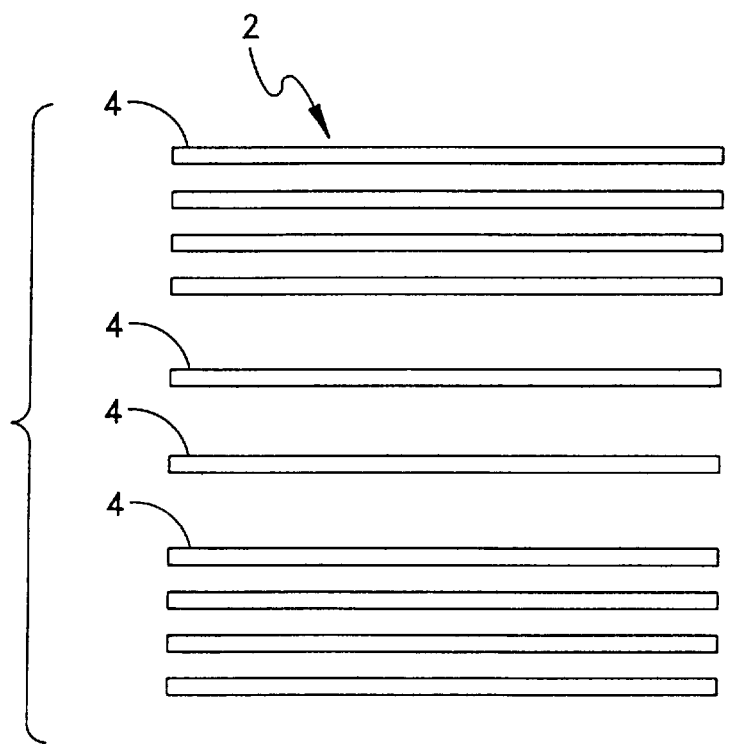
FIG. 2 is a front view of the lay-up shown in FIG. 1.

The planar sheet is dried at a temperature sufficient to dry the planar sheet without beginning to cure the thermosetting resin. Typically, the drying temperature ranges from abut 200° F. (about 93° C.) to about 300° F. (about 149° C.), with about 225° F. (about 107° C.) to about 275° F. (about 135° C.) preferred. Once the planar sheet has been dried it is cut to the desired sizes of main sheets 4 and laminated (see FIGS. 1 and 2). Generally, water transport plates, as with other fuel cell components, are about 89 cm (about 35 inches) by about 89 cm (35 inches) or about 114 cm (about 45 inches) by about 114 cm (about 45 inches). Alternatively, the water transport plate of the present invention may be 30 cm by 15 cm or 12 inches by 6 inches.

Lamination comprises laying-up the main sheets 4 on top of one-another. The lay-up may consist of virtually any number of main sheets 4. The lay-up 2 is laminated by placing it within a molding press and compressing to the desired thickness of about 1.27 mm (about 0.05 inches) to about 3.81 mm (about 0.15 inches) under an axial load of up to about 3,000 psig and a temperature of about 300° F. (about 150° C.) to about 450° F. (about 230° C.), with a temperature of about 325° F. (about 165° C.) to about 379° F. (about 190° C.) preferred for about 1 to about 15 minutes. The laminated lay-up is then carbonized by heating at about 8° F./hour to about 1,500° F. (about 815° C.) and remaining at that temperature for about 0.5 hours to about 4 hours, and subsequently graphitized at about 3,632° F. (about 2,000° C.) to about 5,432° F. (about 3,000° C.) for about 2 hours to about 4 hours. The graphitized water transport plate blank is machined to the required thickness, planform size and coolant and reactant flow configurations. The multiple plies of the water transport plate of the present invention minimizes the possibility of contiguous large pores than can defeat the bubble pressure capability of the water transport plate and the attendant gas/water separation capability in the proton exchange membrane.

Lastly, the machined water transport plate is treated with a wettability preserving compound taken from the group consisting of oxides or hydroxides of aluminum, silicon, tin, niobium ruthenium, tantalum and tungsten. This wettability treatment is described in commonly owned pending application Ser. No. 08/751,543 filed Nov. 15, 1996.

It should be noted that the planar sheets can be formed from the graphite powder, reinforcing fibers, and cellulosic fibers. In such a case, once the planar sheets have been formed and dried, they can be impregnated with the thermosetting resin.

The invention will be further clarified with reference to the following illustrative examples. These examples are meant to illustrate the process of forming the laminated water transport plate of the present invention. They are not, however, meant to limit the scope thereof.

EXAMPLE 1

The following process can be utilized to form a 40 wt % AirCo 90 graphite powder, 5 wt % FORTAFIL ½ inch unsized carbon fiber, 28 wt % OXYCHEM Phenolic resin, and 27 wt % Softwood Pulp.
1. Water is mixed with the solids in a portion of 0.4 g graphite powder, 0.05 g carbon fibers, 0.28 g Oxy-Chem Phenolic Resin, and 0.27 g Softwood Pulp to form a slurry having about 1 v/o solids.
2. Once thoroughly blended, the slurry is showered onto a horizontally moving screen to form a planar sheet with a basis weight of 250 lb./ream or 12 oz/sq.-yard, plus or minus 5%.
3. The screen is passed over a vacuum to remove some of the remaining water, and thereby partially dry the planar sheet.
4. The partially dried planar sheet is then directed over rollers and oil heated drums to volatilize residual water and form the dried paper. The drums are heated to 250° F.
5. The dried paper is spooled on a cardboard tube for collection.
6. The spooled paper is cut into 10–12 inch by 6 inch sheets.
7. The sheets are then laid up.
8. The lay-up is then compression molded to 0.140 inches at 2370 psig for 5 minutes at 345° F. (about 175° C.) to laminate the lay-up.
9. The laminated lay-up is carbonized in a nitrogen environment up to 1510° F. (about 820° C.) at 8° F. per hour and subsequently graphitized at 4262° F. at 77° F./hour (2350° C. at 25° C./hour).
10. The graphitized water transport plate blank is machined to a planform of 12.26 inches by 6.00 inches and to a thickness of 0.072 inches. 0.024 inch deep coolant flow channels are machined into one face and 0.025 inch deep air flow channels are machined into the opposite face.
11. The machined water transport plate is wettability treated with tin oxide by saturating the plate by immersion in a solution of 1.7 moles per liter of tin tetrachloride pentahydrate dissolved in water, removing the plate from the tin solution and immersing in an ammonia solution maintained at a pH of about 9, removing the plate from the ammonia solution and drying at 150–200° F. (65–93° C.), and calcining in air at 400° C. (750° F.) for 1 hour.

In this example, the water transport plate possesses the following physical properties:

| | |
|---|---|
| Bubble pressure | 9.5 psig |
| Water permeability | $400 \times 10^{-17}$ m$^2$ |
| Thru-Plane Resistivity | 0.025 ohm-cm |
| Compressive Yield Strength | 1100 psig |
| Median Pore Size | 2.3 microns |
| Open Porosity | 42% |

There are numerous advantages realized by the water transport plate of the present invention. The water transport plate has improved structural integrity due to the use of longer reinforcing fibers than prior art water transport plates and has more uniform bubble pressure. Both of which allow use of thinner components which results in reduced cost and greater power per unit volume.

The methods of manufacturing discussed above are one of many ways to manufacture the water transport plate of the present invention. However, the resultant water transport plate must exhibit the inventive parameters and properties in accordance with the present invention in order to optimize fuel cell operation. As a result, other methods are contemplated which are capable of manufacturing a water transport plate which exhibit the aforesaid inventive physical properties.

It would be appreciated by those skilled in the art that various changes and modifications can be made to the illustrated embodiments without departing from the spirit of the present invention. All such modifications and changes are intended to be covered by the appended claims.

What is claimed is:

1. A method of using a water transport plate in a fuel cell, comprising the steps of:

providing a porous water transport plate having a maximum thru-plane resistivity of 0.04 ohm-cm, a minimum compressive yield strength of 750 psi, maximum pore size of 3.0 microns and a minimum open porosity of 30 volume percent;

filling said porous water transport plate with water; and employing said porous water transport plate in a fuel cell for management of water therein.

2. The method of claim 1, further comprising the steps of:

creating bubble pressure in said porous water transport plate in the range of 5 to 15 psig; and providing water permeability of said porous water transport plate in the range of $30 \times 10^{-17}$ m$^2$ to $2,000 \times 10^{-17}$ m$^2$.

3. The method of claim 1, wherein said thru-plane resistivity of said porous water transport plate is approximately 0.02 ohm-cm.

4. The method of claim 1, wherein said compressive yield strength of said porous water transport plate is approximately 1,050 psi.

5. The method of claim 1, wherein said pore size of said porous water transport plate is approximately 1.9 microns.

6. The method of claim 1, wherein said open porosity of said porous water transport plate is approximately 40 volume percent.

7. The method of claim 2, wherein said bubble pressure within said porous water transport plate is approximately 10.5 psig.

8. The method of claim 2, wherein said water permeability through said porous water transport plate is approximately $200 \times 10^{-17}$ m$^2$.

9. A method of using a porous water transport plate in a fuel cell, comprising the steps of:

providing a porous water transport plate having a maximum thru-plane resistivity of 0.04 ohm-cm, a minimum compressive yield strength of 750 psi, maximum pore size of 3.0 microns and a minimum open porosity of 30 volume percent;

filling said porous water transport plate with water;

creating bubble pressure in said porous water transport plate in the range of 5 to 15 psig; and providing water permeability of said porous water transport plate in the range of $30 \times 10^{-17}$ m$^2$ to $2,000 \times 10^{-17}$ m$^2$;

employing said porous water transport plate in a fuel cell for management of water therein.

* * * * *